Apr. 10, 1923.
E. R. VIBERG
TRUCK CONSTRUCTION
Filed May 2, 1922
1,451,243
2 sheets-sheet 1
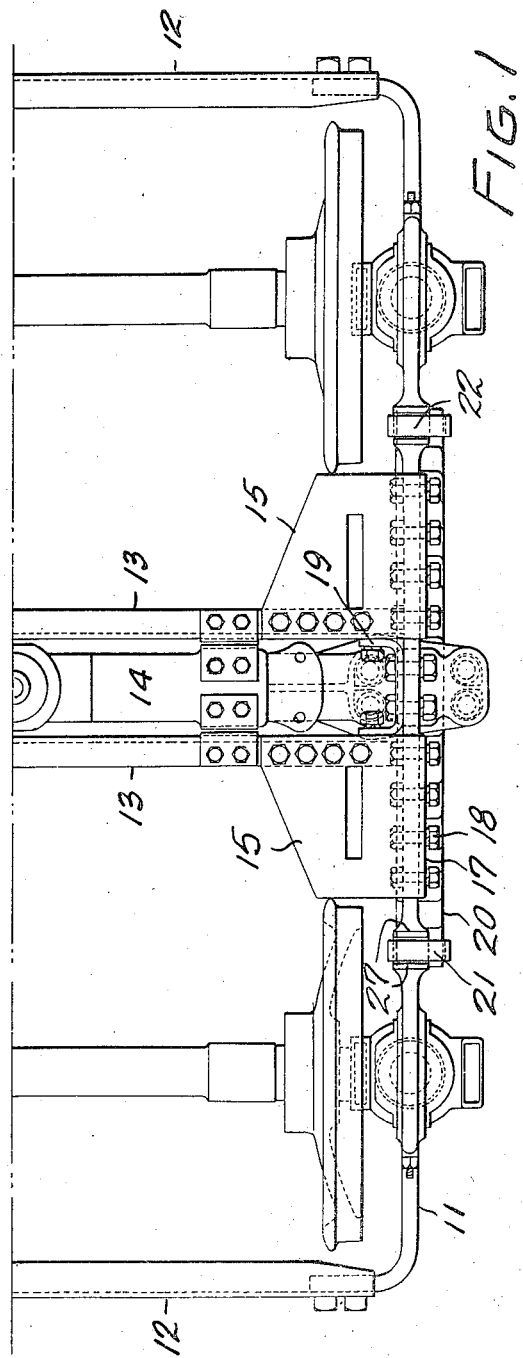
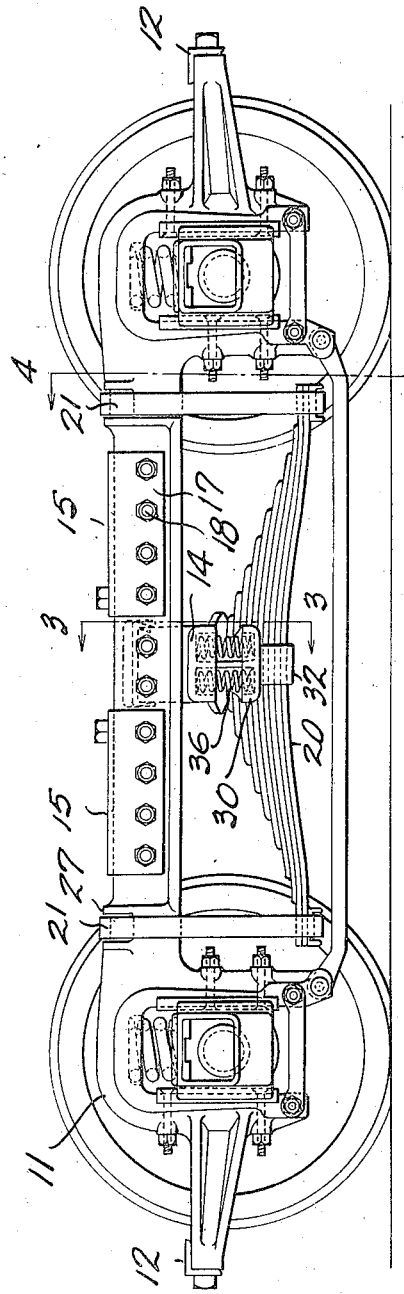
Inventor
Ernest R. Viberg
By Fetherstonhaugh & Co
Attys.

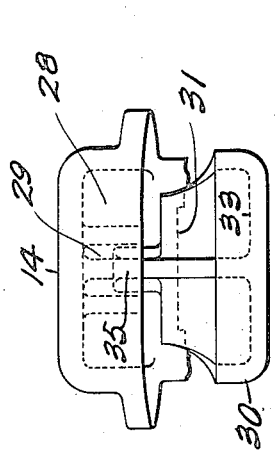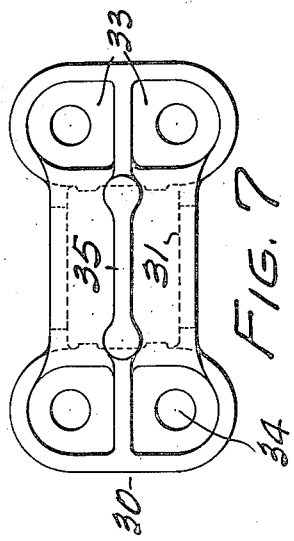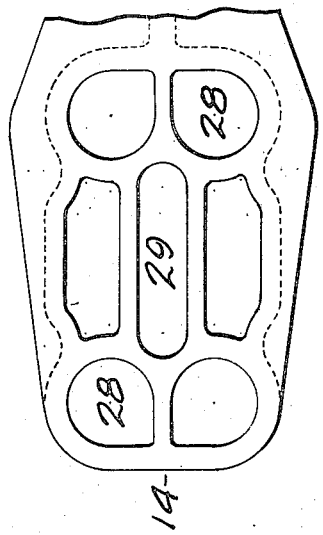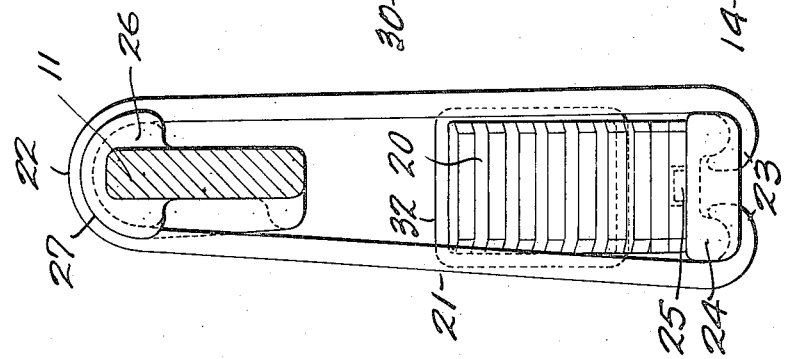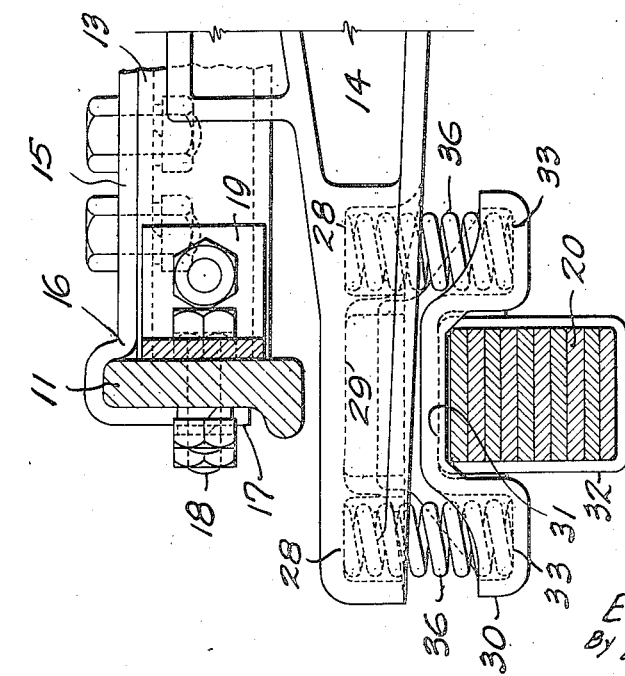

Patented Apr. 10, 1923.

1,451,243

UNITED STATES PATENT OFFICE.

ERNEST R. VIBERG, OF MONTREAL, QUEBEC, CANADA.

TRUCK CONSTRUCTION.

Application filed May 2, 1922. Serial No. 557,987.

*To all whom it may concern:*

Be it known that I, ERNEST R. VIBERG, a subject of the King of Great Britain, and resident of the city of Montreal, in the Province of Quebec and Dominion of Canada, have invented certain new and useful Improvements in Truck Construction, of which the following is a full, clear, and exact description.

This invention relates to improvements in car trucks and more particularly to the spring suspension of the bolster, and the object of the invention is to provide a truck which will have substantially equal riding qualities either when the car is heavily loaded or lightly loaded. A further object is to provide means in the spring suspension permitting side sway play. A still further object is to provide improved truck construction of a simple and inexpensive character, in which the bolster is positioned comparatively low down in the truck, thus permitting a lowering of the car body and a low centre of gravity.

The invention resides briefly in providing a pair of truck side frames connected by transoms, between which the truck bolster floats on the springs. These transoms are connected to the side frames primarily by gusset plates which hook over the side frames and absorb a large part of the stresses, thus relieving the securing bolts or rivets from a large part of such stresses, so that they do not become loosened. Each end of the bolster is supported on the centre of a heavy semi-elliptic spring, the ends of which are suspended from the truck side frames by laterally oscillatable hangers. Between the bolster ends and the semi-elliptic springs, cushioning means are provided to resiliently support the car body when the same is empty or lighty loaded. When the car body is heavily loaded, the cushioning means yields sufficiently for the bolster to make direct contact with the heavy semi-elliptic springs, which are then flexed by the weight of the car body, whereas during the unloaded or lightly loaded condition of the body, these springs are substantially rigid.

In the drawings which illustrate one form of this invention

Fig. 1 is a half-plan view of a truck, the brake gear being omitted.

Fig. 2 is a side elevation of the truck.

Fig. 3 is a cross-section on the line 3—3, Fig. 2, on an enlarged scale.

Fig. 4 is a cross-section on the line 4—4, Fig. 2 on the same scale as Fig. 3.

Fig. 5 is a fragmentary enlarged side elevation of the spring hanger.

Fig. 6 is an enlarged elevation of the bolster end and cushion yoke as seen in Fig. 2.

Fig. 7 is a plan view of the cushion yoke.

Fig. 8 is a bottom plan view of the bolster end.

Referring more particularly to the drawings, 11 designates a side frame of any suitable construction, which in the drawings is shown as of a cast or forged type. The side frames on opposite sides of the truck are connected at their ends by members 12 and at the centre by spaced transoms 13, between which the truck bolster 14 floats. The transoms 13 are preferably structural shapes such as channels, and are located with their upper surfaces a short distance below the top line of the side frames, as will be clearly seen in Fig. 3. Gusset plates 15 are rigidly secured to the ends of the transoms and are upwardly bent in contact with the side frames as at 16. The gusset plates are then bent over the tops of the side frames and downwardly outside the side frames, as indicated at 17, and are connected to the side frames by fastenings 18. The transoms are additionally connected to one another and to the side frames by brackets 19.

A heavy, semi-elliptic spring 20 is suspended from each side frame by hangers 21, which support the ends of the spring. These hangers, as clearly shown in Fig. 4, each comprise a strip of metal bent intermediate its ends to U-shape as at 22, Fig. 4, and hooked at each extremity as at 23, to engage under the extremity of the spring. A small saddle or bearing 24 may be supported on the hooked ends of the hanger, to provide better bearing surface for the spring and also to provide a pin or stud 25, to engage in a recess of the spring and hold the same against sliding on the saddle. At the central U bend 22, the hanger is supported on the side frame by means of a substantially semi-cylindrical bearing 26, carried by the frame, which bearing permits the hanger to oscillate freely. This bearing may be flanged as at 27 to retain the hanger.

The upper surface of the bolster 14, slopes downwardly from the centre to the ends, or if not so formed, may be located sufficiently low in the truck so that its ends will pass under the side frames, as illustrated in Fig. 3. The ends of the bolster are provided on the under side with a plurality of recesses or pockets 28, to form the upper seats for springs 36, preferably four in number, disposed symmetrically about the axis of the bolster, and in such position that they will be also symmetrically disposed about the plane of the spring 20. In addition, each bolster end is provided with a recess 29, preferably in position to lie centrally over the spring 20. A yoke or saddle designated as a whole by the numeral 30 is mounted on the centre of each spring 20. This saddle depends on the inner and outer sides of the spring, as clearly shown in Fig. 3, and is thereby held against movement laterally of the spring. The under surface of the saddle between the depending portions is recessed at 31 to receive the spring binder 32, and the saddle is thereby held against movement longitudinally of the spring. The ends of the saddle, that is to say, the depending portions, are provided in the upper surface with pockets or recesses 33, disposed to lie centrally under the several recesses or pockets 28 of the bolster end. The bottoms of these recesses are provided with drainage openings 34. The central part of the saddle is provided with a strong, up-standing rib 35, adapted to enter the bolster recesses 29, and have limited vertical movement therein, but substantially no side or end play. These ribs serve to transmit side sway between the bolster and truck frame through the medium of the springs 20 and their hangers. Suitable helical springs 36 are mounted in compression between the bolster ends and saddles, being seated in the pockets 28 and 33.

The operation of the device is as follows: The weight of the car body and the load therein is transmitted to the bolster 14, and from the bolster through the springs 36 and saddles 30 to the springs 20, which are suspended on the truck frame, and thereby transmit the load of the body to the frame and wheels. When the load is small, the springs 36 are only slightly compressed, and serve to yieldingly support the bolsters and body. The heavy, semi-elliptic springs which are designed for much heavier loads, are substantially unflexed, and may be regarded as rigid under light load conditions. When the load is increased, the compression of the springs 36 permits the bolster to lower into contact with the central part of the saddle 30, so that the saddle becomes merely a member in compression, and the load is thus transmitted directly from the bolster to the springs 20, which are under the increased load sufficiently yielding to provide the desired easy-riding qualities. When the load in the car is reduced, the springs 36 re-assert themselves and provide a yielding support for the car proportionate to the weight.

A truck moves laterally under the car body in following slight irregularities of the track, and if this movement is transmitted to the car body, an unpleasant sensation is experienced by the passengers, and in addition, the car body soon acquires a lateral sway, which may even assume dangerous proportions. According to this invention, such lateral motion of the trucks is largely taken up in the oscillatable spring hangers 21, which will move freely in their bearings 26, with the result that the springs 20 and bolster will receive very little side motion. If the body of the car should acquire side motion independent of the trucks, this motion is transmitted through the ribs 35 of the spring saddles to the springs 20, and as these springs may swing by means of their hangers in the truck, the lateral motion is not transmitted to the truck.

The bent over gusset plates, which are securely attached to the transoms with the fastenings in shearing stress, receive most of the stresses transmitted between the side frames and transoms, so that the fastenings of the gusset plate to the side frames, which fastenings are in tension, are relieved of a large part of the stresses and do not become readily loosened. The result is that the truck frame remains rigid and free from rattles.

The disposition of the semi-elliptic spring transversely of the bolster and in the plane of the side frame, permits of the movable supporting of said spring, so that the bolster may have free movement transversely of the truck. This cannot be accomplished when the main springs are disposed transversely of the truck as is customary.

Having thus described my invention, what I claim is—

1. In truck construction, the combination with side frames and a transom of a gusset plate, rigidly secured to the transom and bent to embrace the side frame and to engage the inner and outer surfaces thereof, whereby stresses will be transmitted between the side frame and transom, independent of fastenings connecting the side frame and gusset plate.

2. A device of the class described, comprising the combination with a side frame and a transom disposed with its top below the upper edge of the side frame, of a gusset plate rigidly attached to the top of the transom and extending in the plane of the transom top into contact with the side frame, said gusset plate being turned upwardly in engagement with the inner surface of the side frame, and outwardly in engagement with the top of the side frame, and downwardly in engagement with the outer surface of the side frame, whereby the transom is supported on the side frame and whereby stresses will be transmitted between the transom and side frame independent of any fastenings between the gusset plate and side frame.

3. In a device of the class described, the combination with a truck side frame and a semi-elliptic spring disposed in the plane of the side frame, of substantially semi-cylindrical bearings carried by the side frame and hangers for connecting the ends of said spring to the side frame looped over the bearings to oscillate transversely to the plane of the side frame.

4. In a device of the class described, the combination of a truck side frame and a semi-elliptic spring disposed in the plane of the side frame, of hangers connecting the ends of said springs to the side frame, said hangers being oscillatable transversely of the plane of the side frame and comprising each a strip of metal bent intermediate its ends over the side frame, the ends of the said strip being bent toward one another and upwardly and a spring saddle supported on the forwardly turned ends of each hanger and supporting the end of the spring.

5. In truck construction, the combination with a bolster and a main spring support therefor, of auxiliary spring supports interposed between the bolster and the main support and disposed on opposite sides of the latter.

6. In a truck, the combination with a side frame and a bolster, of a semi-elliptic spring disposed in the plane of the side frame, means oscillatably supporting the spring, a saddle on the spring and helical springs disposed symmetrically about the elliptic spring, and in compression between said saddle and the bolster.

7. A device according to claim 6, in which the semi-elliptic spring is oscillatable transversely of the plane of the frame, in combination with inter-engaging means on the saddle and bolster connecting the bolster and semi-elliptic spring for lateral movement.

8. In a truck, the combination with a bolster and a semi-elliptic spring, including a centre band, or a saddle embracing said spring, and held by such embracing engagement against movement transversely of the spring, said saddle being recessed for and receiving the spring band, whereby the saddle is held against movement longitudinally of the spring, and helical springs disposed between the saddle and bolster.

9. In combination with a device according to claim 8, interengaging means on said saddle and bolster, uniting the bolster and semi-elliptic spring for movement in certain directions.

10. A device according to claim 8, in which the bolster is recessed, in combination with a rib on the saddle, engageable in the bolster recess, and having limited movement therein in a vertical direction only.

11. A device according to claim 8 in which the bolster and semi-elliptic spring are disposed transversely of one another, in combination with a truck side frame and hangers supporting the spring for bodily movement laterally of the truck frame.

12. The combination with a bolster recessed in its under surface, and a main spring, of a saddle spanning the main spring under the bolster, said saddle having pockets on each side of the main spring, disposed centrally under the bolster recesses, and helical springs in compression between the bolster and saddle seated in the saddle pockets and bolster recesses, and normally holding the bolster out of engagement with the saddle.

13. In combination with the device according to claim 12, a projection on the saddle, having vertical movement only in one of the bolster recesses.

14. In combination with a device according to claim 12, a rib on the saddle engaging in one of the bolster recesses and holding the saddle against movement laterally and longitudinally of the bolster, and inter-engaging means on the saddle and spring holding the spring against bodily movement laterally and longitudinally of the bolster.

15. In combination with a device according to claim 12, mutually engageable load transmitting portions on said bolster and saddle.

In witness whereof, I have hereunto set my hand.

ERNEST R. VIBERG.